(12) United States Patent
Stergiou

(10) Patent No.: US 8,682,933 B2
(45) Date of Patent: Mar. 25, 2014

(54) TRAVERSAL BASED DIRECTED GRAPH COMPACTION

(75) Inventor: Stergios Stergiou, East Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 7 days.

(21) Appl. No.: 13/440,481

(22) Filed: Apr. 5, 2012

(65) Prior Publication Data

US 2013/0268565 A1 Oct. 10, 2013

(51) Int. Cl.
*G06F 17/30* (2006.01)

(52) U.S. Cl.
USPC ............................................................ 707/798

(58) Field of Classification Search
USPC ............................................................ 707/798
See application file for complete search history.

(56) References Cited

U.S. PATENT DOCUMENTS

| 7,561,534 | B2* | 7/2009 | Alicherry et al. | 370/255 |
|---|---|---|---|---|
| 2006/0206872 | A1* | 9/2006 | Krishnaswamy | 717/133 |
| 2006/0287842 | A1* | 12/2006 | Kim | 702/183 |
| 2007/0018986 | A1* | 1/2007 | Hauser | 345/440 |
| 2009/0055813 | A1* | 2/2009 | Haber et al. | 717/158 |
| 2010/0153152 | A1* | 6/2010 | Kind | 705/7 |
| 2010/0214313 | A1* | 8/2010 | Herman et al. | 345/593 |
| 2011/0148879 | A1* | 6/2011 | Moreno | 345/440 |
| 2011/0219368 | A1* | 9/2011 | Festi | 717/174 |
| 2012/0121161 | A1* | 5/2012 | Eade et al. | 382/153 |
| 2012/0197854 | A1* | 8/2012 | Amaral et al. | 707/705 |
| 2012/0197944 | A1* | 8/2012 | Foti | 707/798 |

* cited by examiner

*Primary Examiner* — Cam-Linh Nguyen
(74) *Attorney, Agent, or Firm* — Baker Botts L.L.P.

(57) ABSTRACT

A directed graph comprises a plurality of nodes including a root node and a non-root node. Each of the plurality of nodes has a plurality of directed edges. The directed graph is traversed, with the plurality of nodes being visited according to an order of the directed edges of each of the plurality of nodes. The directed edge that leads to the non-root node is discarded when the non-root node is visited for the first time during the traversal of the directed graph.

27 Claims, 6 Drawing Sheets

TRAVERSAL BASED DIRECTED GRAPH COMPACTION

TECHNICAL FIELD

This disclosure generally relates to compacting directed graphs.

BACKGROUND

A directed graph, or digraph, may include a set of nodes and a set of directed edges. The nodes may also be referred to as vertices, and the directed edges may also be referred to as arcs or arrows. Each directed edge leads from one specific node to another specific node in the graph.

Directed graphs may be used to represent various types of data. Under some circumstances, directed graphs, such as those used to represent data, may need to be stored (e.g., in persistent or non-transient memory) for some periods of time.

SUMMARY

In particular embodiments, a directed graph is compacted for storage based on the traversal of the graph. The directed graph may have a plurality of nodes that includes one or more root nodes and one or more non-root nodes. Each node has a plurality of directed edges. In particular embodiments, the number and order of the directed edges each node has are known, and during the traversal of the graph, the nodes are visited according to the order of the directed edges of each node.

In particular embodiments, when a non-root node is visited for the first time during the traversal of the directed graph, the directed edge that leads to the non-root node is discarded and not stored. In addition, in particular embodiments, when a non-root node is visited for the first time during the traversal of the directed graph, the non-root node is stored.

In particular embodiments, when a non-root node is visited for each subsequent time during the traversal of the directed graph, the directed edge that leads to the non-root node is stored.

In particular embodiments, when a root node is visited during the traversal of the directed graph, the root node is stored.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF EXAMPLE EMBODIMENTS

In particular embodiments, directed graphs are compacted for storage (e.g., in persistent or non-transient memory). A directed graph may include a set of nodes and a set of directed edges, with each directed edge leading from one specific node to another specific node in the graph. In particular embodiments, the number and the order of the directed edges each node has are known. The directed graph is traversed according to the order of the directed edges of each node. Based on the traversal of the graph, some directed edges may be discarded and not stored, while other directed edges are stored. Consequently, it takes less memory space to store the entire directed graph.

A directed graph is a pair G=(V,A) of: (1) a set V, whose elements are called vertices or nodes; and (2) a set A of ordered pairs of nodes, whose elements are called arcs, directed edges, or arrows. In general, a directed graph may include any number of nodes and any number of directed edges, with each directed edge leading from one specific node to another specific node in the graph. In particular embodiments, when a directed edge leads from one node, node_A, to another node, node_B, node_A may be referred to as a parent node of node_B, and node_B may be referred to as a child node of node_A. Within a directed graph, there may be any number of root nodes, leaf or terminal nodes, or non-root and non-terminal nodes. In particular embodiments, when a node does not have any parent nodes, it is considered a root node. When a node does not have any child nodes, it is considered a leaf or terminal node. When a node has at least one parent node and at least one child node, it is considered a non-root and non-terminal node.

Figure 1:
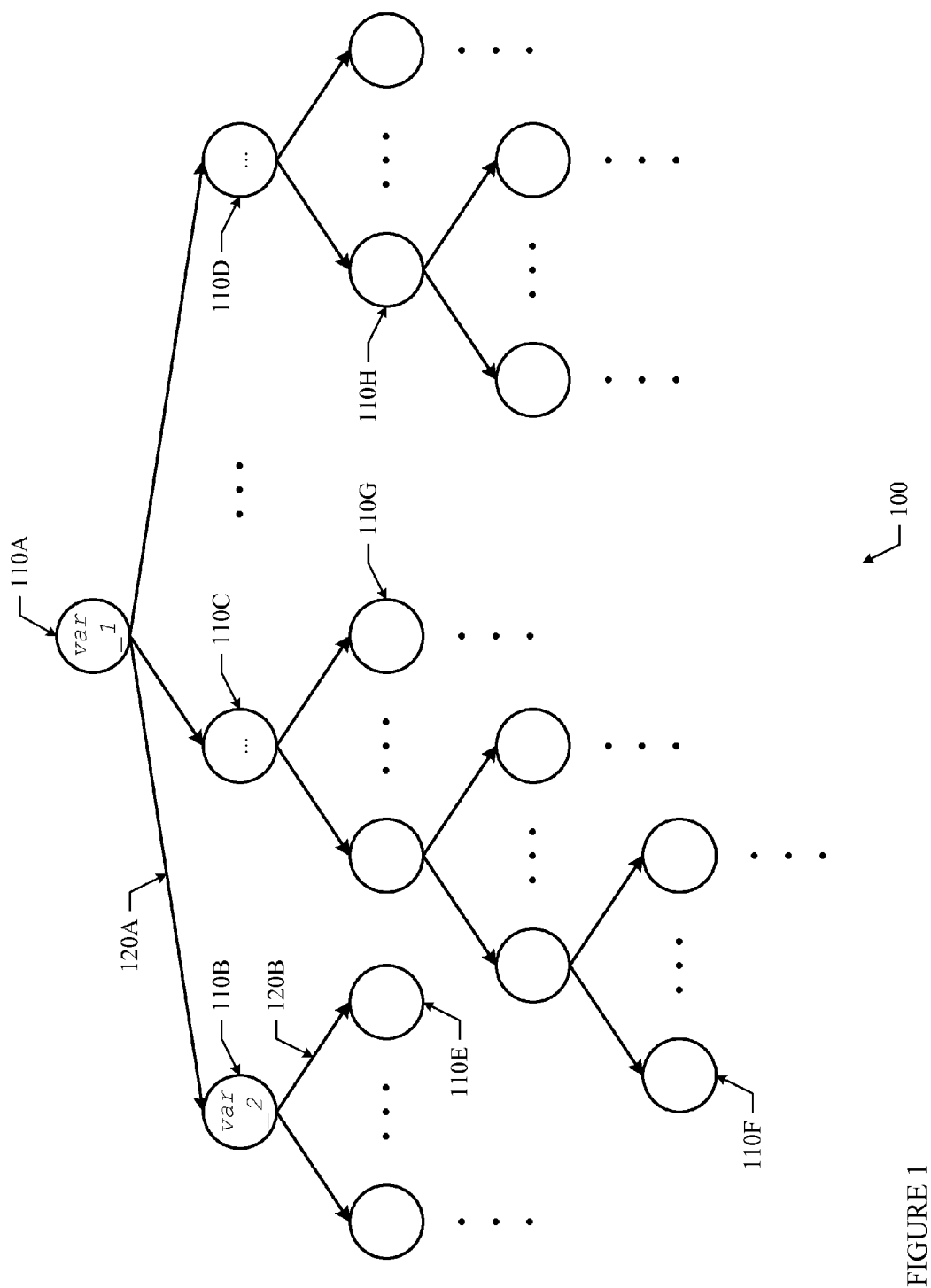
FIG. 1 illustrates an example directed graph.

FIG. 1 illustrates an example directed graph 100, which includes a number of nodes 110 and a number of directed edges 120. Within directed graph 100, for example, node 110A is a root node, as it does not have any parent nodes. Nodes 110E and 110F are each a terminal node, as they do not have any child nodes. Nodes 110B, 110C, and 110D are each a non-root and non-terminal node, as they each have at least one parent node and at least one child node. As an example, directed edge 120A leads from node 110A to node 110B; thus, node 110A is considered the parent node of node 110B, and node 110B is considered the child node of node 110A. Directed edge 120B leads from node 110B to node 110E; thus, node 110B is considered the parent node of node 110E, and node 110E is considered the child node of node 110B. Moreover, within directed graph 100, nodes 110B, 110C, and 110D are on the same level (i.e., the second level); and nodes 110E, 110G, and 110H are on the same level (i.e., the third level).

In particular embodiments, for each node in a directed graph, if there are j directed edges originating from that node and leading to other nodes, then that node is considered to have j edges. Within a directed graph, there may be various paths formed by specific nodes and directed edges. As an example, in directed graph 100, one of the paths is formed by node 110A to node 110B via directed edge 120A, and then to node 110E via directed edge 120B.

In particular embodiments, a directed graph may be used to represent data. Each node may correspond to or represent a variable. For example, with directed graph 100, node 110A may represent variable var_1, and node 110B may represent variable var_2, and so on. In particular embodiments, each node may be identified with a unique node identifier (ID), and each variable represented by a specific node may be identified with a unique variable ID. As an example, in directed graph 100, variable var_1 (var_1 being a variable ID) is represented by node 110A (110A being a node ID). Variable var_2 (var_2 being another variable ID) is represented by node 110B (110B being another node ID)

There are different types of directed graphs, one of which is a binary decision diagram (BDD). A BDD is a rooted, directed, and acyclic graph. It may include any number of non-terminal nodes, also referred to as decision nodes, and two terminal nodes: a 0 or FALSE terminal node and a 1 or TRUE terminal node. Each decision or non-terminal node has two directed edges: a 0 edge, typically denoted as a dash or dotted line in the graph, and a 1 edge, typically denoted as a solid line in the graph. In particular embodiments, a BDD may be used to represent a Boolean function, with each decision node representing a different variable of the Boolean function.

Figure 2:
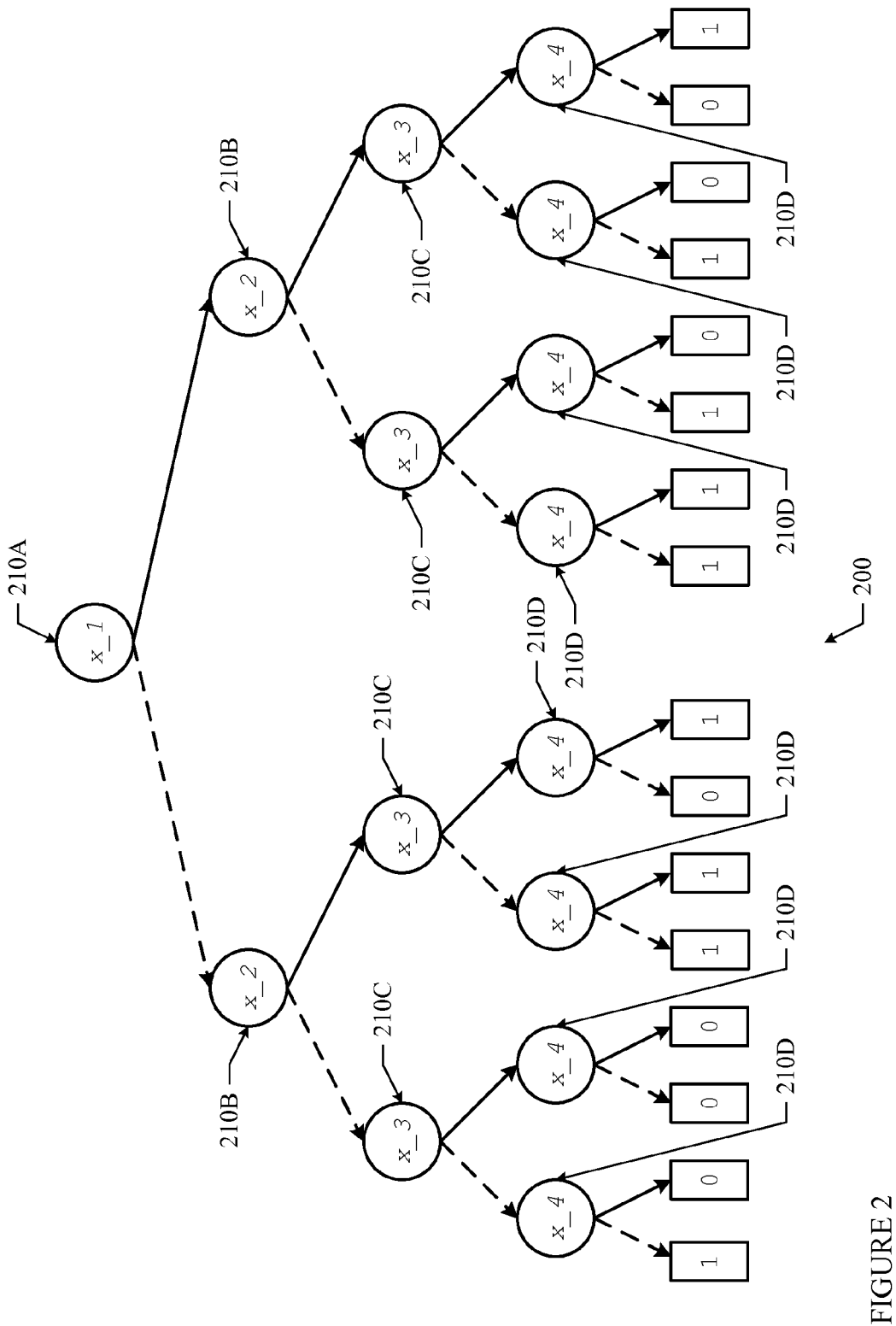
FIG. 2 illustrates an example binary decision diagram.

FIG. 2 illustrates an example BDD 200 that represents a Boolean function having four variables: $x\_1$, $x\_2$, $x\_3$, and $x\_4$. Since the Boolean function represented by BDD 200 has four variables, BDD 200 has at most four decision-node layers, layers 1 to 4. That is, there are at most four layers in BDD 200 that each have at least one decision node. More specifically, in FIG. 2, decision node 210A, which represents variable $x\_1$, is at layer 1 of BDD 200; decision nodes 210B, which represent variable $x\_2$, are at layer 2 of BDD 200; decision nodes 210C, which represent variable $x\_3$, are at layer 3 of BDD 200; and decision nodes 210D, which represent variable $x\_4$, are at layer 4 of BDD 200. Each path in BDD 200, formed by specific decision nodes 210 and their associated edges, leads to either the 0 terminal node or the 1 terminal node, indicating that the Boolean function evaluates to either FALSE or TRUE, respectively. Note that for readability, the 0 terminal node and the 1 terminal node are duplicated multiple times in FIG. 2.

Figure 3:
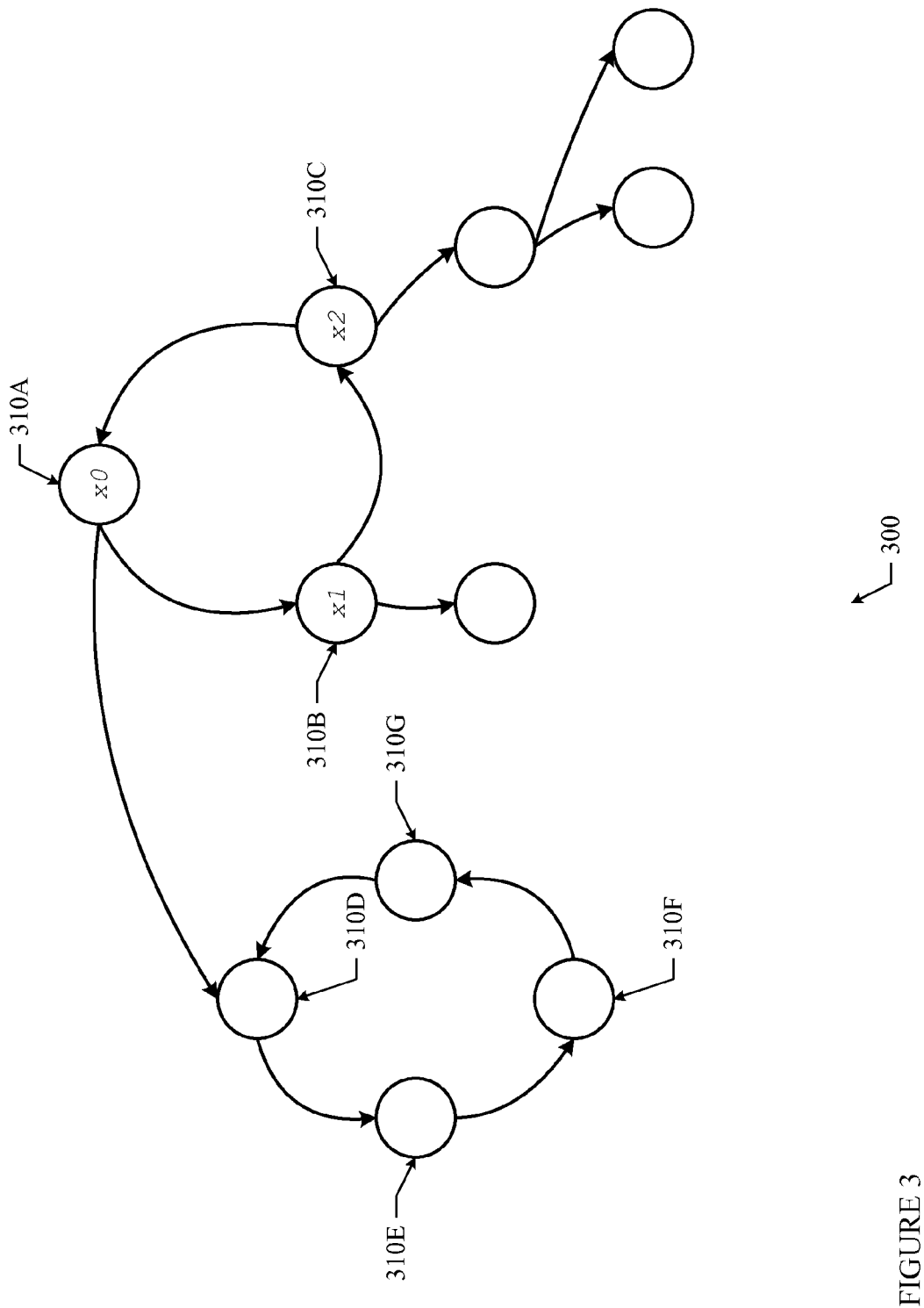
FIG. 3 illustrates an example directed graph that includes cyclic paths.

A directed graph may be cyclic or circular, where the nodes and directed edges in the graph form at least one circular path. FIG. 3 illustrates an example directed graph 300 that includes two cyclic or circular paths: the first being formed by nodes 310A, 310B, and 310C, and the second being formed by nodes 310D, 310E, 310F, and 310G. There are other acyclic paths in graph 300 as well.

In particular embodiments, a directed graph may be stored in, for example, persistent or non-transient memory for some periods of time. One way to store such a graph is to store each and every node and directed edge in the graph. To further explain, consider an example BDD 400 illustrated in FIG. 4. BDD 400 represents a Boolean function having five variables: $x\_1$, $x\_2$, $x\_3$, $x\_4$, and $x\_5$. Node 410A represents variable $x\_1$. Nodes 410B and 410H represent variable $x\_2$. Nodes 410C and 410F represent variable $x\_3$. Nodes 410D and 410G represent variable $x\_4$. Node 410E represents variable $x\_5$. Note that in FIG. 4, the two terminal nodes are denoted as T and F, which are equivalent to 1 and 0, respectively.

In particular embodiments, to store a directed graph, all the nodes and directed edges in the directed graph are stored. As an example, BDD 400 may be stored using the following sequence: x0 410B 410H x1 410C 410F x2 (T) 410D x3 (T) 410E x4 (T) (F) x2 410D 410G x3 (T) (F) x1 410F 410G. In particular embodiments, each node is uniquely identified with a node ID and each variable represented by a specific node is uniquely identified with a variable ID. For example, with BDD 400, node 410A represents variable x0; here, "410A" may be the node ID and "x0" may be the variable ID. Similarly, node 410B represents variable x1; here, "410B" may be the node ID and "x1" may be the variable ID. With some implementations, to store a specific node, the variable ID of the variable represented by that node may be stored. Thus, to store node 410A, "x0", which is the variable ID of the variable represented by node 410A, is stored. Similarly, to store node 410B, "x1", which is the variable ID of the variable represented by node 410B, is stored. To store a directed edge, the node ID of the node to which that directed edge leads may be stored. Thus, to store edge 420A, the node ID of the node leading to edge 420A (i.e., "410B") is stored. Similarly, to store edge 420B, the node ID of the node leading to edge 420B (i.e., "410H") is stored.

Following this scheme, in BDD 400, node 410A has two edges, leading to nodes 410B and 410H, respectively. In the above sequence, the segment "x0 410B 410H" are used to store node 410A and its two edges, with "x0" being used to store node 410A, "410B" being used to store edge 420A, and "410H" being used to store edge 420B. Node 410B also has two edges, leading to nodes 410C and 410F, respectively. In the above sequence, the segment "x1 410C 410F" are used to store node 410B and its two edges, with "x1" being used to store node 410B, "410C" being used to store edge 420C, and "410F" being used to store edge 420D. The two terminal nodes are stored as "(T)" and "(F)", respectively.

With some implementations, each node ID and each variable ID may be a unique integer number. To distinguish between node ID numbers and variable ID numbers in a stored sequence, for example, the node IDs may be positive numbers while the variable IDs may be negative numbers, or vice versa. Alternatively, the node IDs may be within one range of numbers (e.g., between 1 and 1000) while the variable IDs may be within another range of numbers (e.g., greater than or equal to 10000). With some implementations, the root nodes may be stored separately, apart from the non-root nodes and the directed edges.

There are other schemes for storing nodes and directed edges as well as variables represented by specific nodes in a directed graph, and this disclosure contemplates any applicable scheme. For example, each directed edge may be uniquely identified with an edge ID, and the edge IDs may be used to store the edges in a graph.

Storing each and every node and edge in a directed graph may require a large amount of memory, especially since in practice, a directed graph may include thousands, even tens of thousands of nodes and edges. For example, with a BDD, where each node has only two edges, if there are a total of k nodes in the BDD, then there are a total of 2k edges. The total number of nodes and edges need to be stored may be as much as 3k. With other types of directed graphs, where each node may have many edges, the number of edges in the graph is even greater. As k increases, the amount of memory required to store all the nodes and edges in the graph may increase rapidly.

Figure 5:
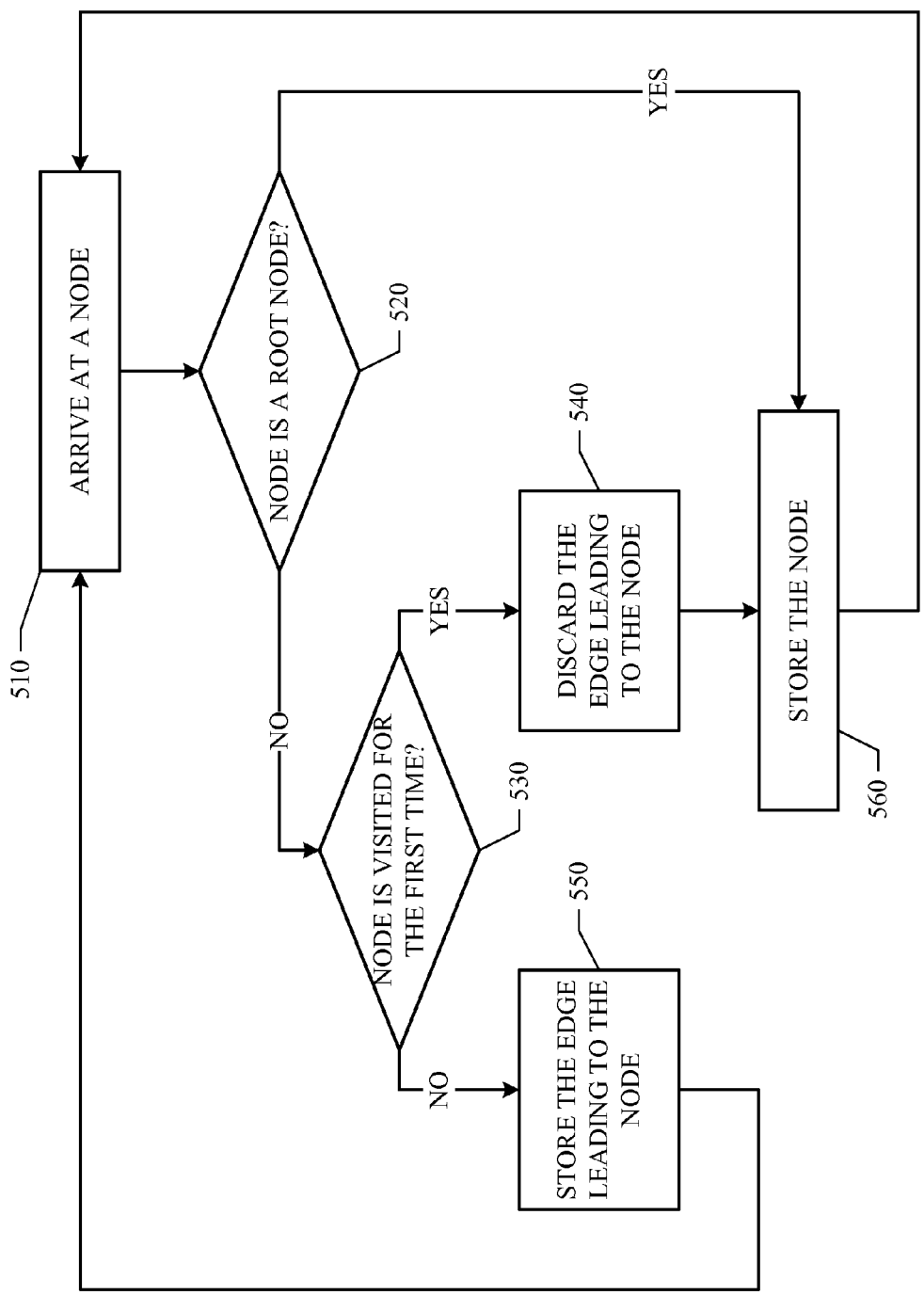
FIG. 5 illustrates an example method for compacting a directed graph.

In particular embodiments, a directed graph may be compacted for storage so that not all the directed edges in the graph are stored. Consequently, it takes less memory space to store the entire graph. FIG. 5 illustrates an example method for compacting a directed graph for storage. Given a directed graph to be compacted and stored, in particular embodiments, the number of directed edges each node has (i.e., the number of directed edges originating from each node) is known. In addition, the edges of each node are arranged according to a known order.

In particular embodiments, the directed graph is traversed so that the nodes in the graph are visited systematically. With some implementations, the graph traversal may be based on a depth-first search (DFS) algorithm. In this case, the traversal starts at the root (e.g., selecting some node in the graph as the root node) and explores as far as possible along each path (e.g., reaching all the way to a terminal node) before backtracking Alternatively, in other implementations, the graph traversal may be based on a breadth-first search (BFS) algorithm. In this case, the traversal starts at the root (e.g., selecting some node in the graph as the root node) and explores all the neighboring nodes. Then, for each of those nearest nodes, the traversal explores their unexplored neighbor nodes, and so on, until all the nodes are visited. There are other algorithms for systematically traversing a graph, and this disclosure contemplates any applicable algorithm.

In particular embodiments, the directed graph may be traversed according to the order of the edges of each node. That is, during the traversal of the graph, at each node, the edges of the node may be explored according to the order of the edges. For example, at each node, the edges of the node may be explored from left to right or from right to left.

In particular embodiments, while traversing the directed graph, it may arrive at a specific node in the graph, as illustrated in OPERATION 510. A determination is made as to whether this node currently being visited is a root node, as illustrated in OPERATION 520. A root node is a node that does not have any parent nodes. This means that there is no directed edge leading to a root node. If the current node is a root node (OPERATION 520—"YES"), then the current root node is stored, as illustrated in OPERATION 560. On the other hand, if the current node is not a root node (OPERATION 520—"NO"), which means that there is at least one directed edge leading to the current non-root node, then a determination is made as to whether the current non-root node is being visited for the very first time during the traversal of the graph, as illustrated in OPERATION 530. If the current non-root node is being visited for the first time during the traversal of the graph (OPERATION 530—"YES"), then the directed edge currently leading to the current non-root node is discarded and not stored, as illustrated in OPERATION 540. The current non-root node is stored, as illustrated in OPERATION 560. On the other hand, if this is not the first time the current non-root node is being visited (e.g., this is a subsequent time, such as the second or third or fourth . . . time, the current non-root node is being visited), then the directed edge currently leading to the current non-root node is stored, as illustrated in OPERATION 550. Note that in this case, the current non-root node is not stored.

In particular embodiments, OPERATIONS 510-560 may be repeated each time a node is being visited during the systematic traversal of the graph, until the graph traversal is completed. With some implementations, to determine whether a specific node is being visited for the first time during the traversal of the graph, an indicator, such as a Boolean flag, may be associated with each node in the graph. Initially, the flags associated with all the nodes may be initialized to one value (e.g., FALSE). Then, during the graph traversal, when a node is being visited for the first time, the value of its associated flag may be reset to another value (e.g., TRUE). A flag associated with a specific node may thus indicate whether that node has already been visited during the traversal of the graph.

Figure 4:
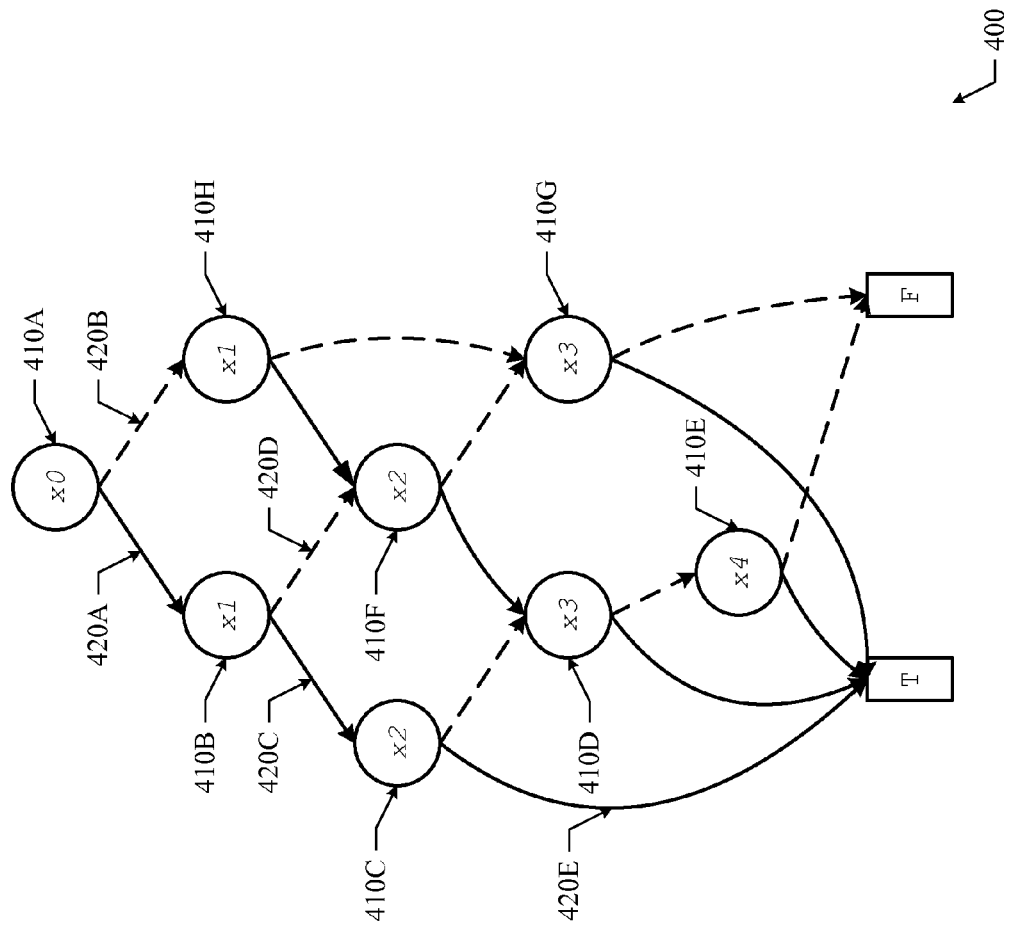
FIG. 4 illustrates an example binary decision diagram.

To further explain the operations illustrated in FIG. 5, consider BDD 400 illustrated in FIG. 4. Using the method illustrated in FIG. 5 and traversing BDD 400 based on a DFS algorithm, BDD 400 may be stored using the following sequence: x0 x1 x2 (T) x3 (T) x4 (T) (F) x2 410D x3 (T) (F) x1 410F 410G. Note that several directed edges in BDD 400 are not stored in this second sequence (e.g., the two edges of node 410A, the two edges of node 410B, the right edge of node 410C, the right edge of node 410D, and the right edge of node 410F are discarded and not stored), and thus storing this second sequence requires less memory space than storing the first sequence above, which includes every node and directed edge in BDD 400. In general, with a BDD where each node has two directed edges, if there are a total of k nodes in the BDD, then there are a total of 2k edges. Among the k nodes, there are k−1 non-root nodes and one root node. Thus, k−1 edges, which is nearly half of the edges, may be discarded, and only k+1 edges need to be stored, together with the k nodes. As an example, if it takes 32 bits to store each node ID that references an edge and 16 bits to store each variable ID that references a node, the compaction of the graph may be as much as 1.66×.

For example, suppose that BDD 400 is traversed such that the edges of each node are followed in the order from left to right. During the first iteration, node 410A is being visited. Since node 410A is a root node, it is stored (e.g., by storing the variable ID, x0, of the variable represented by node 410A). The traversal follows the left edge (i.e., the 1 edge) from node 410A and arrives at node 410B.

During the second iteration, node 410B is being visited. Node 410B is not a root node and is being visited for the first time during the graph traversal. Thus, the edge (i.e., edge 420A) leading from node 410A to node 410B is discarded and not stored. Node 410B is stored (e.g., by storing the variable ID, x1, of the variable represented by node 410B). The graph traversal follows the left edge (i.e., the 1 edge) from node 410B and arrives at node 410C.

During the third iteration, node 410C is being visited. Node 410C is not a root node and is being visited for the first time during the graph traversal. Thus, the edge (i.e., edge 420C) leading from node 410B to node 410C is discarded and not stored. Node 410C is stored (e.g., by storing the variable ID, x2, of the variable represented by node 410C). The graph traversal follows the left edge (i.e., the 1 edge) from node 410C and arrives at terminal node T (i.e., the 1 or TRUE terminal node). Unlike other types of directed graphs, a BDD only has two terminal nodes, T and F, and they are treated specially. With some implementations, for a BDD, each time the graph traversal arrives at either the T or the F terminal node, the terminal node is stored. This is equivalent to storing the directed edge currently leading to the terminal node (e.g., in this case, edge 420E). Note that for other types of directed graphs, in particular embodiments, each terminal or leaf node may be treated the same as any non-root non-leaf nodes. Thus, following x2, (T) is stored in the sequence. Since the graph traversal has reached the end of the current path and arrived at a terminal node, it backtracks to node 410D next, because the right edge (i.e., the 0 edge) from node 410C leads to node 410D.

During the fourth iteration, node 410D is being visited. Node 410D is not a root node and is being visited for the first time during the graph traversal. Thus, the edge leading from node 410C to node 410D is discarded and not stored. Node 410D is stored (e.g., by storing the variable ID, x3, of the variable represented by node 410D). The graph traversal follows the left edge (i.e., the 1 edge) from node 410D and arrives at the T terminal node. Thus, following x3, (T) is stored in the sequence. The graph traversal has reached the end of the current path and backtracks to node 410E next, because the right edge (i.e., the 0 edge) from node 410D leads to node 410E.

During the fifth iteration, node 410E is being visited. Node 410E is not a root node and is being visited for the first time during the graph traversal. Thus, the edge leading from node 410D to node 410E is discarded and not stored. Node 410E is stored (e.g., by storing the variable ID, x4, of the variable represented by node 410E). The left edge (i.e., the 1 edge) from node 410E leads to the T terminal node, and the right edge (i.e., the 0 edge) from node 410E leads to the F terminal node. Thus, following x4, first (T) and then (F) are stored in the sequence. The graph traversal backtracks to node 410F, as the right edge (i.e., the 0 edge, which is edge 420D) from node 410B leads to node 410F.

During the sixth iteration, node 410F is being visited. Node 410F is not a root node and is being visited for the first time during the graph traversal. Thus, the edge leading from node 410B to node 410F (i.e., edge 420D) is discarded and not stored. Node 410F is stored (e.g., by storing the variable ID, x2, of the variable represented by node 410F). Note that since both nodes 410C and 410F represent variable x2, x2 is stored in place of node 410C as well as node 410F in the sequence. The graph traversal follows the left edge (i.e., the 1 edge) from node 410F and arrives at node 410D.

During the seventh iteration, node 410D is being visited. Node 410D is not a root node. However, this is the second time node 410D is being visited during the graph traversal. Thus, the directed edge leading from node 410F to node 410D is stored (e.g., by storing the node ID of the node to which the directed edge leads, and in this case 410D). Since all the edges originating from node 410D have already been traversed, the graph traversal backtracks to node 410G, as the right edge (i.e., the 0 edge) from node 410F leads to node 410G.

During the eighth iteration, node 410G is being visited. Node 410G is not a root node and is being visited for the first time during the graph traversal. Thus, the edge leading from node 410F to node 410G is discarded and not stored. Node 410G is stored (e.g., by storing the variable ID, x3, of the variable represented by node 410G). Note that since both nodes 410D and 410G represent variable x3, x3 is stored in place of node 410D as well as node 410G in the sequence. The left edge (i.e., the 1 edge) from node 410G leads to the T terminal node, and the right edge (i.e., the 0 edge) from node 410G leads to the F terminal node. Thus, following x3, first (T) and then (F) are stored in the sequence. The graph traversal backtracks to node 410H, as the right edge (i.e., the 0 edge) from node 410A leads to node 410H.

During the ninth iteration, node 410H is being visited. Node 410H is not a root node and is being visited for the first time during the graph traversal. Thus, the edge leading from node 410A to node 410H (i.e., edge 420B) is discarded and not stored. Node 410H is stored (e.g., by storing the variable ID, x1, of the variable represented by node 410H). Note that since both nodes 410B and 410H represent variable x1, x1 is stored in place of both nodes 410B 410G in the sequence. The graph traversal follows the left edge (i.e., the 1 edge) from node 410H and arrives at node 410F.

During the tenth iteration, node 410F is being visited. Node 410F is not a root node. However, this is the second time node 410F is being visited during the graph traversal. Thus, the directed edge leading from node 410H to node 410F is stored (e.g., by storing the node ID of the node to which the directed edge leads, and in this case 410F). Since all the edges originating from node 410F have already been traversed, the graph traversal backtracks to node 410G, as the right edge (i.e., the 0 edge) from node 410H leads to node 410G.

During the eleventh iteration, node 410G is being visited. Node 410G is not a root node. However, this is the second time node 410G is being visited during the graph traversal. Thus, the directed edge leading from node 410H to node 410G is stored (e.g., by storing the node ID of the node to which the directed edge leads, and in this case 410G). At this point, all the paths in BDD 400 have been visited, and thus, the graph traversal is completed.

In this case with BDD 400, at each node, the edges of the node are traversed from left to right. Alternatively, in another case, at each node, the edges of the node may be traversed from right to left. The resulting sequence may differ in terms of the ordering of the variable or node IDs. However, the directed graph is compacted regardless of which specific ordering of the edges the traversal follows.

Although BDD 400 is used as a specific example to further explain the operations illustrated in FIG. 5, in particular embodiments, the method illustrated in FIG. 5 may be employed to compact and store any types of directed graphs, including directed graphs that have circular paths. For example, in FIG. 3, assuming that nodes 310A, 310B, and 310C represent variables x0, x1, and x2, respectively, the circular path formed by nodes 310A, 310B, and 310C in graph 300 may be stored using the following sequence: x0 x1 x2 310A. In particular embodiments, since the number and the order of directed edges each node has are known, the original directed graph may be derived from the compacted sequence, even though some of the directed edges in the graph are not explicitly stored.

In particular embodiments, the method illustrated in FIG. 5 may be implemented as computer software, where the code may be stored in one or more computer-readable, non-transient storage and executed by one or more computing or electronic devices or computer systems.

Figure 6:
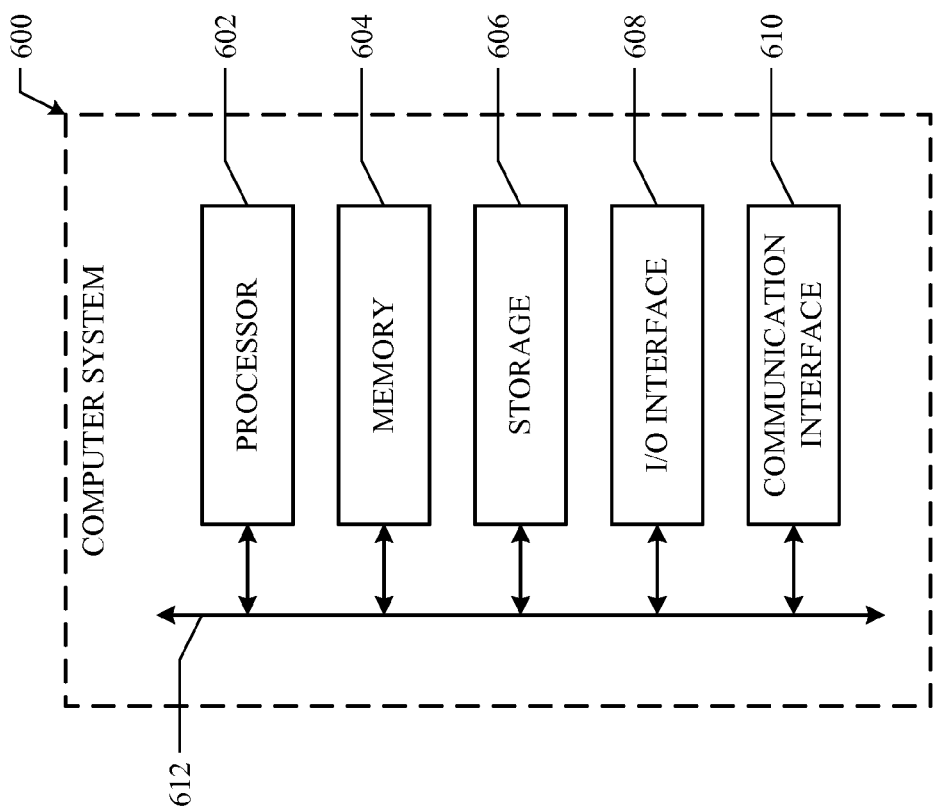
FIG. 6 illustrates an example computer system.

FIG. 6 illustrates an example computer system 600. In particular embodiments, one or more computer systems 600 perform one or more operations of one or more methods described or illustrated herein. In particular embodiments, one or more computer systems 600 provide functionality described or illustrated herein. In particular embodiments, software running on one or more computer systems 600 performs one or more operations of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more operations of one or more methods described or illustrated herein. As an example and not by way of limitation, one or more computer systems 600 may perform in real time or in batch mode one or more operations of one or more methods described or illustrated herein. One or more computer systems 600 may perform at different times or at different locations one or more operations of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A system comprising:
    a memory comprising instructions executable by one or more processors; and
    the one or more processors coupled to the memory and operable to execute the instructions, the instructions causing the one or more processors to perform:
        traversing a directed graph,
            the directed graph comprising a plurality of nodes that includes a root node and a non-root node,
            each of the plurality of nodes having a plurality of directed edges, and
            the plurality of nodes being visited according to an order of the directed edges of each of the plurality of the nodes; and
        discarding the directed edge that leads to the non-root node in response to determining that the non-root node is visited for the first time during the traversal of the directed graph.

2. The system of claim 1, wherein the instructions cause the one or more processors to perform
    storing the directed edge that leads to the non-root node when the non-root node is visited each subsequent time during the traversal of the directed graph.

3. The system of claim 2, wherein the instructions cause the one or more processors to perform
    storing the non-root node when the non-root node is visited for the first time during the traversal of the directed graph.

4. The system of claim 3, wherein:
    each of the plurality of nodes is identified by a node identifier, and
    each of the plurality of nodes corresponds to a variable that is identified by a variable identifier.

5. The system of claim 4, wherein the instructions cause the one or more processors to perform:
    storing the variable identifier of the variable corresponding to each of the plurality of nodes, and
    storing the node identifier of the node to which the directed edge leads.

6. The system of claim 1, wherein the instructions cause the one or more processors to perform
    storing the root node when the root node is visited during the traversal of the directed graph.

7. The system of claim 1, wherein the traversal of the directed graph is based on a depth-first search algorithm.

8. The system of claim 1, wherein the traversal of the directed graph is based on a breadth-first search algorithm.

9. The system of claim 1, wherein:
    the directed graph is a Binary Decision Diagram (BDD),
    each of the plurality of nodes of the BDD has two directed edges, and
    if a number of the nodes of the BDD is k, then k−1 directed edges are discarded and k+1 edges are stored.

10. A method, performed by one or more electronic devices, comprising:
    traversing a directed graph, the directed graph comprising a plurality of nodes that includes a root node and a non-root node,
each of the plurality of nodes having a plurality of directed edges, and
the plurality of nodes being visited according to an order of the directed edges of each of the plurality of the nodes; and
discarding the directed edge that leads to the non-root node in response to determining that the non-root node is visited for the first time during the traversal of the directed graph.

11. The method of claim 10, further comprising
storing the directed edge that leads to the non-root node when the non-root node is visited each subsequent time during the traversal of the directed graph.

12. The method of claim 11, further comprising
storing the non-root node when the non-root node is visited for the first time during the traversal of the directed graph.

13. The method of claim 12, wherein:
each of the plurality of nodes is identified by a node identifier, and
each of the plurality of nodes corresponds to a variable that is identified by a variable identifier.

14. The method of claim 13, further comprising:
storing the variable identifier of the variable corresponding to each of the plurality of nodes, and
storing the node identifier of the node to which the directed edge leads.

15. The method of claim 10, further comprising
storing the root node when the root node is visited during the traversal of the directed graph.

16. The method of claim 10, wherein the traversal of the directed graph is based on a depth-first search algorithm.

17. The method of claim 10, wherein the traversal of the directed graph is based on a breadth-first search algorithm.

18. The method of claim 10, wherein:
the directed graph is a Binary Decision Diagram (BDD),
each of the plurality of nodes of the BDD has two directed edges, and
if a number of the nodes of the BDD is k, then k−1 directed edges are discarded and k+1 edges are stored.

19. One or more computer-readable non-transitory storage media embodying software operable when executed by one or more computer systems to:
traverse a directed graph,
the directed graph comprising a plurality of nodes that includes a root node and a non-root node,
each of the plurality of nodes having a plurality of directed edges, and
the plurality of nodes being visited according to an order of the directed edges of each of the plurality of the nodes; and
discard the directed edge that leads to the non-root node in response to determining that the non-root node is visited for the first time during the traversal of the directed graph.

20. The media of claim 19, wherein the software is further operable when executed by the one or more computer systems to
store the directed edge that leads to the non-root node when the non-root node is visited for each subsequent time during the traversal of the directed graph.

21. The media of claim 20, wherein the software is further operable when executed by the one or more computer systems to
store the non-root node when the non-root node is visited for the first time during the traversal of the directed graph.

22. The media of claim 21, wherein:
each of the plurality of nodes is identified by a node identifier, and
each of the plurality of nodes corresponds to a variable that is identified by a variable identifier.

23. The media of claim 22, wherein the software is further operable when executed by the one or more computer systems to:
store the variable identifier of the variable corresponding to each of the plurality of node, and
store the node identifier of the node to which the directed edge leads.

24. The media of claim 19, wherein the software is further operable when executed by the one or more computer systems to
store the root node when the root node is visited during the traversal of the directed graph.

25. The media of claim 19, wherein the traversal of the directed graph is based on a depth-first search algorithm.

26. The media of claim 19, wherein the traversal of the directed graph is based on a breadth-first search algorithm.

27. The media of claim 19, wherein:
the directed graph is a Binary Decision Diagram (BDD),
each of the plurality of nodes of the BDD has two directed edges, and
if a number of the nodes of the BDD is k, then k−1 directed edges are discarded and k+1 edges are stored.

* * * * *